(12) United States Patent
Onodera et al.

(10) Patent No.: US 11,598,247 B2
(45) Date of Patent: Mar. 7, 2023

(54) TWO-STROKE INTERNAL COMBUSTION ENGINE

(71) Applicant: YAMABIKO CORPORATION, Tokyo (JP)

(72) Inventors: Hisato Onodera, Tokyo (JP); Ken Shirai, Tokyo (JP); Koichirou Ogura, Tokyo (JP); Tetsuya Isogai, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/521,893

(22) Filed: Nov. 9, 2021

(65) Prior Publication Data

US 2022/0154629 A1 May 19, 2022

(30) Foreign Application Priority Data

Nov. 16, 2020 (JP) .............................. JP2020-190410

(51) Int. Cl.
*F02B 25/16* (2006.01)
*F02B 75/02* (2006.01)

(52) U.S. Cl.
CPC .............. *F02B 25/16* (2013.01); *F02B 75/02* (2013.01); *F02B 2075/025* (2013.01)

(58) Field of Classification Search
CPC ..... F02B 2075/025; F02B 75/02; F02B 25/16
See application file for complete search history.

(56) References Cited

U.S. PATENT DOCUMENTS

| | | | |
|---|---|---|---|
| 2,204,296 A * | 6/1940 | Brooks | F02B 25/00 123/65 R |
| 4,306,522 A * | 12/1981 | Fotsch | F02F 1/22 123/65 PD |
| 5,870,981 A | 2/1999 | Knaus et al. | |
| 6,223,705 B1 | 5/2001 | Sato et al. | |
| 8,353,262 B2 | 1/2013 | Koga et al. | |
| 2002/0139327 A1 | 10/2002 | Uenoyama et al. | |

(Continued)

FOREIGN PATENT DOCUMENTS

| | | |
|---|---|---|
| DE | 202015103778 U1 | 7/2015 |
| JP | S59-134323 A | 8/1984 |

(Continued)

OTHER PUBLICATIONS

Extended European Search Report issued in corresponding European Patent Application No. 21208222.6 dated Apr. 29, 2022 (7 pages).

*Primary Examiner* — Kevin A Lathers

(74) *Attorney, Agent, or Firm* — Kilyk & Bowersox, P.L.L.C.

(57) ABSTRACT

Among multiple scavenging passages 14 included in a cylinder, a scavenging passage connected to at least one scavenging port 16 constitutes a variable scavenging passage 14(*ch*). An upper end portion of the variable scavenging passage 14(*ch*) has a guide surface 50 defining a discharge direction of a scavenging gas discharged from a variable scavenging port 16(*ch*) connected thereto on a horizontal plane. The guide surface 50 includes at least a first guide portion 50(H) defining a first discharge direction of the scavenging gas and a second guide portion 50(L) defining a second discharge direction of the scavenging gas. The discharge direction of the scavenging gas is changed from the first discharge direction to the second discharge direction on the horizontal plane by the first and second guide portions 50(H) and 50(L) in the scavenging stroke.

13 Claims, 19 Drawing Sheets

(56) References Cited

U.S. PATENT DOCUMENTS

2003/0106509 A1* 6/2003 Uenoyama ............. F02M 23/03
                                                              123/73 PP
2016/0376979 A1   12/2016 Osawa et al.

FOREIGN PATENT DOCUMENTS

| JP | S60-6017 A | 1/1985 |
| JP | 60-145417 A | 7/1985 |
| JP | 2000-337154 A | 12/2000 |

* cited by examiner

CROSS SECTION A-A

CROSS SECTION B-B

TWO-STROKE INTERNAL COMBUSTION ENGINE

BACKGROUND OF THE INVENTION

The present invention relates to a two-stroke internal combustion engine.

In a conventional typical two-stroke internal combustion engine, scavenging in a cylinder is performed in the scavenging stroke by using a pre-compressed air-fuel mixture in the crank chamber. The two-stroke internal combustion engine includes a scavenging passage communicating with a crank chamber and a combustion chamber. An upper end opening of the scavenging passage, i.e., a scavenging port, is opened and closed by a piston reciprocating between a top dead center and a bottom dead center. This operation of the piston opens and closes an exhaust port.

When the piston descends during the combustion stroke, an exhaust port and a scavenging port are opened near the bottom dead center of the piston, and the scavenging in the cylinder is started at the same time as the opening of the scavenging port. The scavenging port communicates with the crank chamber via the scavenging passage, and at the same time as the opening of the scavenging port, the pre-compressed air-fuel mixture is discharged from the scavenging port into the cylinder as a scavenging gas.

A conventionally well-known two-stroke internal combustion engine pre-compressing the air-fuel mixture in the crank chamber has a problem of "air-fuel mixture blow-by" occurring in the scavenging stroke. The "air-fuel mixture blow-by" is a phenomenon in which the air-fuel mixture discharged from the scavenging port, i.e., the scavenging gas, is directly discharged from the exhaust port without contributing to the scavenging. This blow-by phenomenon not only pollutes the environment because the unburned air-fuel mixture is discharged, but also lowers an air supply efficiency $\eta_{tr}$ and deteriorates a fuel consumption rate.

To deal with the problem of air-fuel mixture blow-by, "reversal scavenging" was proposed as a method of scavenging and has become the mainstream of current two-stroke engines. The "reversal scavenging" is performed by directing the air-fuel mixture discharged from the scavenging port, i.e., the scavenging gas, to a cylinder wall surface on the intake side opposite to the exhaust port. A reverse scavenging two-stroke engine is disclosed in Japanese Patent No. 5553552 ("Patent Document 1"), for example. As can be seen from the Patent Document 1, the scavenging gas discharged from the scavenging port is directed to the cylinder wall surface on the intake side. Subsequently, the scavenging gas reverses in the cylinder and proceeds toward the exhaust port.

The Patent Document 1 proposes that the scavenging gas discharged from the scavenging port is directed to the cylinder wall surface on the intake side by forming a cross-sectional shape of an upper end portion of the scavenging passage into a substantially triangular shape having the scavenging port as one side.

While environmental problems are attracting attention, exhaust gas regulations are becoming stricter. To respond this situation, various proposals have been made to prevent the air-fuel mixture from blow-by. The scavenging port opens in accordance with the descending operation of the piston, and an effective opening area increases. Japanese Laid-Open Patent Publication Nos. 60-145417 ("Patent Document 2") and 2001-182541 ("Patent Document 3") disclose inventions in which the direction of the air-fuel mixture discharged from the scavenging port, i.e., the scavenging gas, is changed in this process.

For facilitating understanding, a plane spreading along a vertical movement of the piston is called a "vertical plane", and a plane spreading in a lateral direction orthogonal to this plane is called a "horizontal plane".

The Patent Document 2 discloses an invention in which a ceiling wall surface of the upper end portion of the scavenging passage, i.e., a portion near the scavenging port, has a three-dimensional shape, and the discharge direction of the scavenging gas is changed on the vertical plane by the three-dimensional ceiling wall surface. According to this invention, the scavenging gas is directed upward when the scavenging port begins to open. Additionally, as the piston descends and the effective opening area of the scavenging port expands, the scavenging gas is gradually directed downward.

The Patent Document 3 discloses the invention in which a ceiling wall surface of an upper end portion of the scavenging passage, i.e., a portion near the scavenging port, is divided into a first surface on the intake side and a second surface on the exhaust side of a cylinder, and the first surface on the intake side has a relatively large inclination angle for directing the scavenging gas upward as compared to the second surface on the exhaust side. Regarding the shape of this scavenging passage, an upper edge of the scavenging port has a stepped shape, and in the upper edge of the scavenging port, a first half upper edge on the intake side is located on the upper side as compared to a second half upper edge on the exhaust side.

According to the invention of the Patent Document 3, when the piston descends and reaches the first half upper edge on the intake side of the scavenging port and the scavenging port begins to open, the air-fuel mixture discharged from the scavenging port, i.e., the scavenging gas, is directed relatively upward. When the piston further descends and reaches the second half upper edge on the exhaust side of the scavenging port, the scavenging gas discharged from the scavenging port is then directed relatively downward by the second surface having a relatively small inclination angle. Therefore, the invention disclosed in the Patent Document 3 discloses an invention in which the discharge direction of the scavenging gas is changed on a vertical plane as with the Patent Document 2.

As the exhaust gas regulations become stricter, it is necessary to aim for further improvement of air supply efficiency ηtr so as to prevent emission of unburned gas as much as possible and improve an engine output. Considering the proposals of Patent Documents 2, 3 from this point of view, when the combustion chamber is viewed in a plan view, a dead area may occur in which the scavenging gas discharged from the scavenging port does not spread, and a further improvement is expected.

SUMMARY OF THE INVENTION

An object of the present invention is to improve a scavenging efficiency in a cylinder in a two-stroke engine. The present invention can suitably be applied to a reverse-flow type scavenging engine.

It should be noted that some two-stroke engines use a fuel injection device instead of a carburetor for the purpose of more precise fuel control. Regarding the arrangement of the fuel injection device in these engines, in addition to (1) arranging the fuel injection device in an intake system of an engine, (2) arranging the fuel injection device in a crank chamber, etc., (3) the fuel injection device may be arranged in a cylinder. An engine having a fuel injection device arranged in a cylinder is called an "in-cylinder direct injection engine". In an in-cylinder direct injection two-stroke engine, air is supplied to the crank chamber, and this air is pre-compressed in the crank chamber. The pre-compressed air is then introduced through the scavenging passage and the scavenging port into the cylinder as scavenging gas and used for scavenging in the cylinder.

In the description of the present invention, the term "fresh gas" is used as a general term for the air-fuel mixture or air supplied as scavenging gas into the cylinder through the scavenging passage and the scavenging port. Therefore, the term "fresh gas" includes either the air-fuel mixture or air, or the air-fuel mixture and air sequentially flowing into the cylinder.

The technical problem described above is solved in the present invention by providing a two-stroke internal combustion engine comprising:

a piston disposed in a cylinder, reciprocating between a top dead center and a bottom dead center, and defining a combustion chamber;

an exhaust port opening in the cylinder and opened and closed by the piston for discharging a burnt gas in the combustion chamber;

a crank chamber receiving a fresh gas and pre-compressing the fresh gas by a descending movement of the piston; and a plurality of scavenging passages including scavenging ports for communicating with the combustion chamber and the crank chamber in the scavenging stroke and discharging the fresh gas pre-compressed in the crank chamber as a scavenging gas to the combustion chamber, the scavenging port opened and closed by the piston, wherein the scavenging passage included in the plurality of scavenging passages and connected to at least one of the scavenging ports constitutes a variable scavenging passage, wherein an upper end portion of the variable scavenging passage has a guide surface defining a discharge direction of the scavenging gas discharged from a variable scavenging port connected thereto on a horizontal plane, wherein the guide surface includes at least a first guide portion defining a first discharge direction of the scavenging gas and a second guide portion defining a second discharge direction of the scavenging gas, and wherein the discharge direction of the scavenging gas is changed from the first discharge direction to the second discharge direction on the horizontal plane by the first and second guide portions in the scavenging stroke.

According to the present invention, the occurrence of the dead area can be suppressed that may occur in the inventions of the Patent Documents 2 and 3, and as a result, effective gas exchange can be implemented in the cylinder by using the scavenging gas in the scavenging stroke.

The present invention is typically applied to a reverse scavenging engine. In a preferred embodiment of the present invention, the guide surface is made up of upper and lower stepped surfaces. The stepped surfaces may form two upper and lower steps, three steps, or more steps than three steps. The guide surface may be made up of a curved non-stage surface.

In a preferred embodiment of the present invention, for example, when the guide surface at the upper end portion of the scavenging passage connected to the scavenging port is two upper and lower stages, the first discharge direction of the scavenging gas defined by the first guide portion formed in the upper portion of the guide surface is directed to the intake side relative to the second discharge direction of the scavenging gas defined by the second guide portion formed in the lower portion. Therefore, on the horizontal plane, the first discharge direction is directed in a direction relatively far from the center of the cylinder bore with respect to the second discharge direction. Preferably, the first discharge direction is directed to the tangential direction of the inner wall of the cylinder.

The effects and other objects of the present invention will become apparent from the following detailed description of preferred embodiments.

DETAILED DESCRIPTION OF THE PRESENT INVENTION

Figure 1:
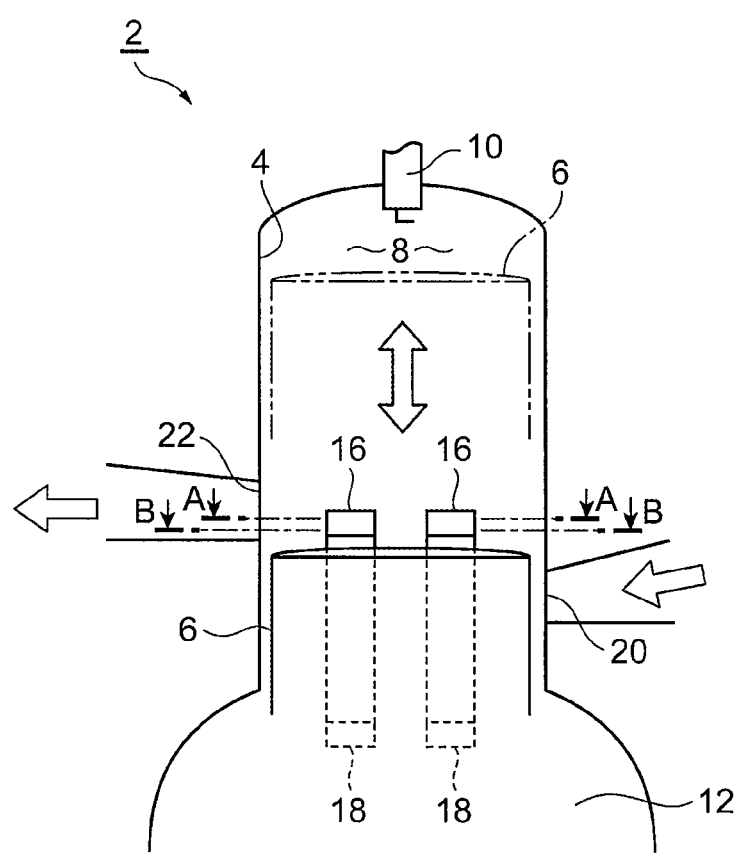
FIG. 1 shows a schematic view of a single-cylinder two-stroke engine of an embodiment.

Preferred embodiments of the present invention will now be described with reference to the accompanying drawings. FIG. 1 is a schematic view of an engine 2 of an embodiment included in a single-cylinder two-stroke internal combustion engine system 100. The engine 2 is suitably applied to a portable working machine such as a chain saw, a blower, and a brush cutter. With reference to FIG. 1, the shown engine 2 has a piston 6 fitted in a cylinder 4, and the piston 6 reciprocates between a top dead center and a bottom dead center. A combustion chamber 8 defined by the piston 6 is disposed with a spark plug 10.

The combustion chamber 8 and the crank chamber 12 are communicated with each other by a scavenging passage 14 in the scavenging stroke. The scavenging passage 14 has a rectangular scavenging port 16 at an upper end, and the scavenging port 16 is opened and closed by the piston 6. The engine 2 has four scavenging ports 16, and upper end edges of the rectangular scavenging ports 16 are arranged at the same height level so that the opening timings of the four scavenging ports are synchronized. A lower end of each of the scavenging ports 16 is open to the crank chamber 12, and the open lower end constitutes a scavenging gas inlet 18. A two-stroke engine equipped with the four scavenging ports 16 is called a "four-flow scavenging engine".

Reference numeral 20 denotes an intake port, and an air-fuel mixture is supplied through the intake port 20 to the crank chamber 12. Reference numeral 22 denotes an exhaust port. The exhaust port 22 is arranged on the side opposite to the intake port 20. The engine 2 is a piston valve type engine. Therefore, the intake port 20 and the exhaust port 22 are opened and closed by the piston 6. The air-fuel mixture is supplied through the intake port 20 to the crank chamber 12, while burnt gas in the combustion chamber 8 is discharged through the exhaust port 22.

Figure 2:
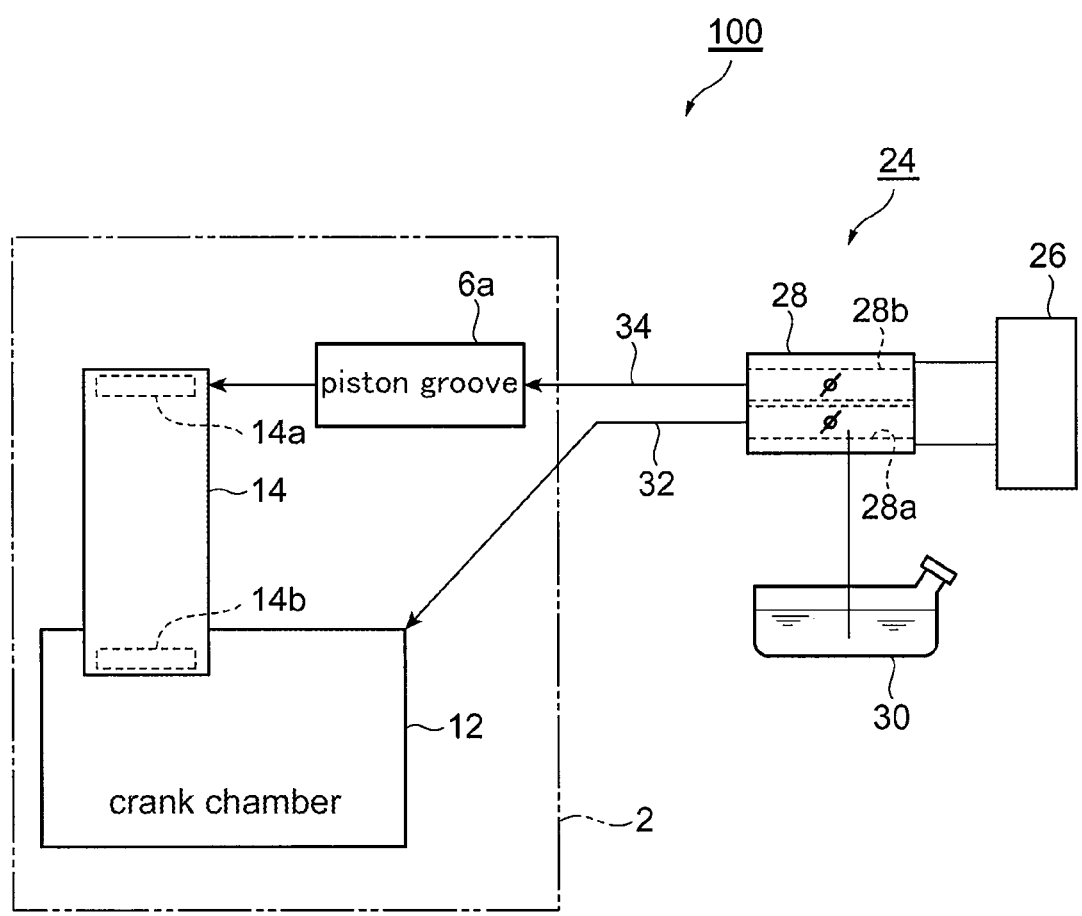
FIG. 2 shows a schematic view of an intake system of a two-stroke engine including the engine of the embodiment.

FIG. 2 is a schematic view of an intake system 24 included in the two-stroke engine system 100. The intake system 24 has an air cleaner 26 at an upstream end, and air purified by the air cleaner 26 is supplied to the carburetor 28. Fuel is supplied to the carburetor 28 from a fuel tank 30, and the carburetor 28 generates an air-fuel mixture.

The engine 2 is a layered scavenging engine. The carburetor 28 has a first passage 28a for generating an air-fuel mixture and a second passage 28b through which the air received from the air cleaner 26 passes. The first passage 28a is an air-fuel mixture generation passage and constitutes a portion of an air-fuel mixture passage 32 leading to the crank chamber 12, and the air-fuel mixture generated by the carburetor 28 is supplied through the air-fuel mixture passage 32 to the crank chamber 12 and then pre-compressed in the crank chamber 12.

The second passage 28b allowing passage of air constitutes a portion of a leading air passage 34 for supplying a leading air to the scavenging passage 14. The piston 6 has a piston groove 6a on a circumferential surface thereof. The leading air received from the air cleaner 26 is supplied via the piston groove 6a to an upper end portion of the scavenging passage 14. Since the piston groove 6a is described in detail in US2016/0376979A1, the piston groove 6a will not be described. A reed valve may be used instead of the piston groove 6a. The reed valve is described in detail in Japanese Laid-Open Patent Publication No. 2000-337154.

In the layered scavenging engine 2, the leading air is supplied to the combustion chamber 8 at the initial stage of the scavenging stroke, and the air-fuel mixture of the crank chamber 12 is then supplied to the combustion chamber 8.

Figure 3:
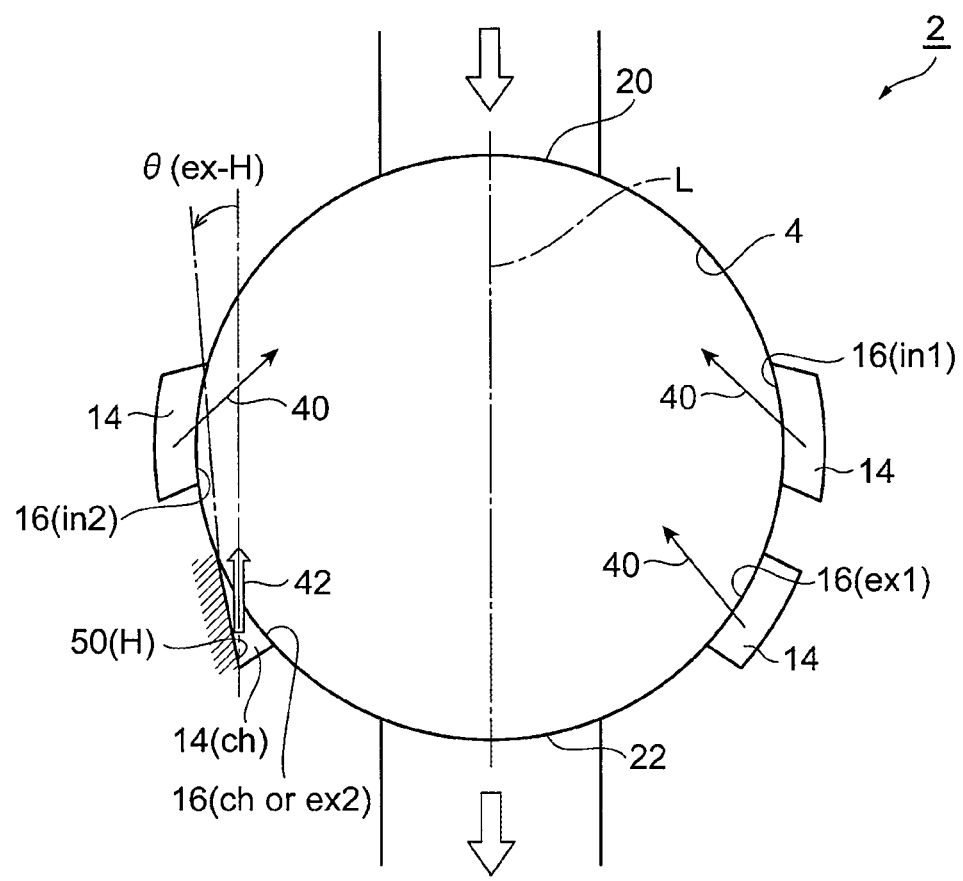
FIG. 3 shows a cross-sectional view taken along a line A-A of FIG. 1.
Figure 4:
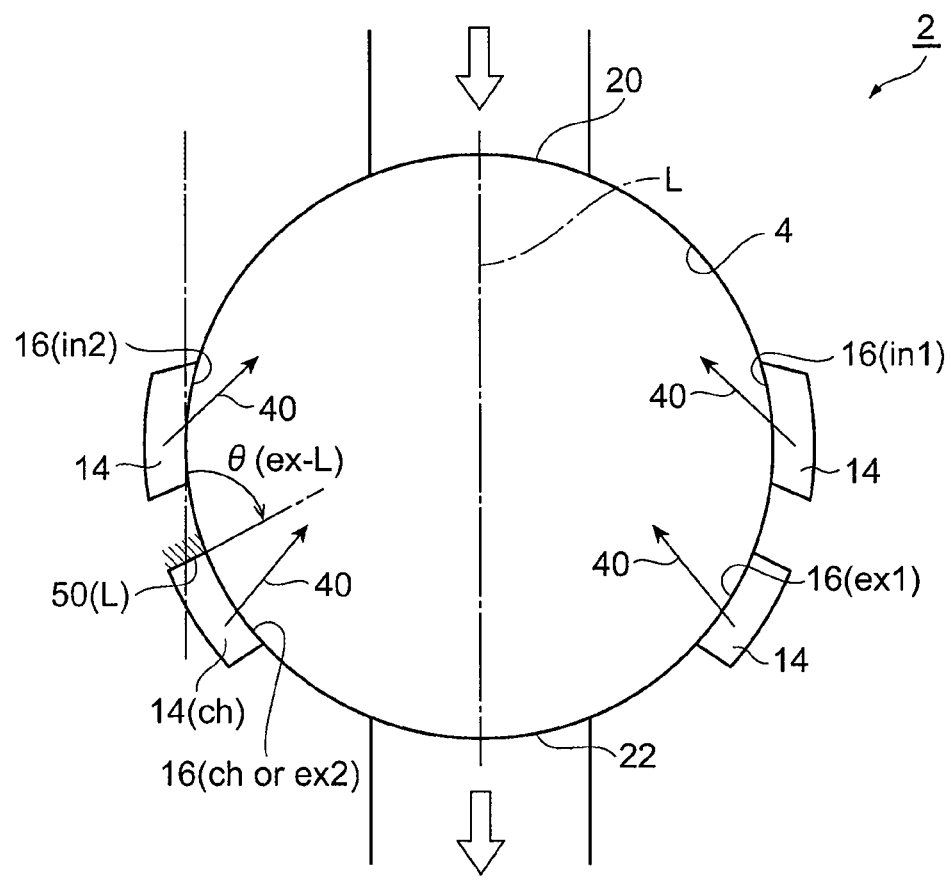
FIG. 4 shows a cross-sectional view taken along a line B-B of FIG. 1.

FIG. 3 is a cross-sectional view taken along a line A-A of FIG. 1. FIG. 4 is a cross-sectional view taken along a line B-B of FIG. 1. As shown in FIGS. 3 and 4, the engine 2 is a "reversal scavenging" type in which the scavenging gas discharged from each of the four scavenging ports 16 is directed toward the intake side of the cylinder.

With reference to FIGS. 3 and 4, the four rectangular scavenging ports 16 are arranged on each side of the cylinder. To identify each of the scavenging ports 16, the scavenging port 16 located closer to the exhaust port 22 between the two scavenging ports 16 located on the right side of the drawing is referred to as an "exhaust-side first scavenging port", and this exhaust-side first scavenging port is denoted by reference numeral "16(ex1)". The scavenging port 16 located closer to the intake port 20 between the two scavenging ports 16 located on the right side of the drawing is referred to as an "intake-side first scavenging port", and this intake-side first scavenging port is denoted by reference numeral "16(in1)".

The scavenging port 16 located closer to the exhaust port 22 between the two scavenging ports 16 located on the left side of the drawing is referred to as an "exhaust-side second scavenging port", and this exhaust-side second scavenging port is denoted by reference numeral "16(ex2)". The scavenging port 16 located closer to the intake port 20 between the two scavenging ports 16 located on the left side of the drawing is referred to as an "intake-side second scavenging port", and this intake-side second scavenging port is denoted by reference numeral "16(in2)".

Arrows 40 in FIGS. 3 and 4 indicate the directivity directions of the scavenging gas discharged from the scavenging ports 16. It can be seen from FIGS. 3 and 4 that the scavenging gas is discharged toward the intake side opposite to the exhaust port 22. In other words, the rectangular scavenging ports 16 of the engine 2 and the upper end portions of the scavenging passages 14 connected thereto have a basic configuration substantially in common with the scavenging ports and the upper end portions of the scavenging passages connected thereto described in, for example, Japanese Laid-Open Patent Publication No. 2000-34927, included in a known scavenging engine.

Among the four scavenging ports 16 included in the engine 2 shown in FIG. 1, the present invention is applied to the upper end portion of the scavenging passage 14 related to the exhaust-side second scavenging port 16(ex2). Therefore, the upper end portions of the scavenging passages 14 related to the exhaust-side first scavenging port 16(ex1), the intake-side first scavenging port 16(in1), and the intake-side second scavenging port 16(in2) other than the exhaust-side second scavenging port 16(ex2) are the same as the conventional upper end portion. The scavenging passage 14 and the scavenging port 16 to which the present invention is applied are referred to as a "variable scavenging passage 14(ch)" and a "variable scavenging port 16(ch)".

Figure 5:
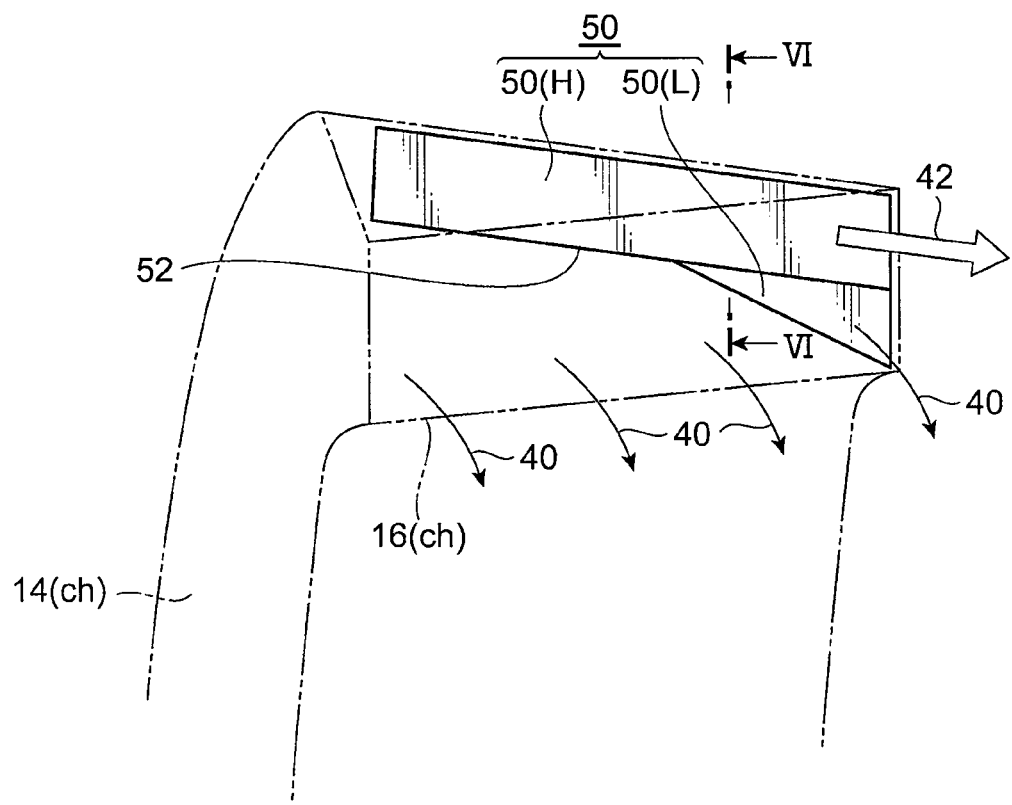
FIG. 5 shows a schematic view for explaining a guide surface formed at an upper end portion of a variable scavenging passage.
Figure 6:
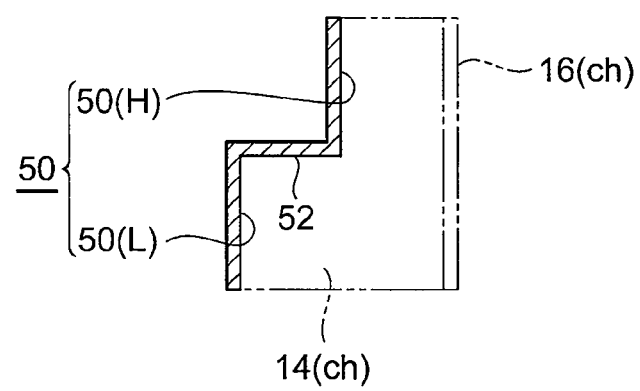
FIG. 6 shows a cross-sectional view taken along a line VI-VI of FIG. 5.

FIG. 5 is a schematic view of the upper end portion of the variable scavenging passage 14(ch), and FIG. 6 is a cross-sectional view taken along a line VI-VI of FIG. 5. At the upper end portion of the variable scavenging passage 14(ch), a side wall surface on the cylinder intake side constitutes a guide surface 50. The guide surface 50 has a function of directing the scavenging gas toward the intake side. The guide surface 50 is made up of an upper guide portion 50(H) and a lower guide portion 50(L). Reference numeral 52 of FIG. 6 denotes a step portion. The step portion 52 is formed between the upper guide portion 50(H) and the lower guide portion 50(L), and the step portion 52 is disposed in the middle of the guide surface 50 in the up-down direction.

Referring to FIGS. 5 and 6, the step portion 52 preferably extends in a direction orthogonal to an axis of the cylinder 4, i.e., a moving direction of the piston 6. Therefore, the step portion 52 is preferably located on the horizontal plane. As a result, at the time of switching from the upper guide portion 50(H) to the lower guide portion 50(L) in the process in which the opening degree of the variable scavenging port 16(ch) is increased by lowering the piston 6, the scavenging gas can be introduced into the cylinder without disturbing the flow of the scavenging gas discharged from the variable scavenging port 16(ch). Although the step portion 52 shown in the figure is made up of a vertical wall, the portion may be made up of an inclined wall or a curved wall.

As can be well understood with reference to FIG. 3, in the cross-sectional shape of the upper end portion of the variable scavenging passage 14(ch), the upper guide portion 50(H) substantially constitutes a hypotenuse of a substantially triangular shape having the variable scavenging port 16(ch), i.e., the exhaust-side second scavenging port 16(ex2) as one side. As described above, FIG. 3 is a cross-sectional view taken along the line A-A of FIG. 1. As shown in FIG. 1, on the cutting line A-A, the descending piston 6 is located slightly below the upper edge of the rectangular scavenging port 16. Therefore, FIG. 3 shows the cross-sectional shape of the upper end portion of the scavenging passage 14(ch) immediately after the scavenging stroke is started in the variable scavenging passage 14(ch) leading to the variable scavenging port 16(ch) leading to the variable scavenging port 16(ch).

As shown in FIG. 3, the upper guide portion 50(H) is made up of a surface extending in the tangential direction of the inner wall of the cylinder 4 from the exhaust side toward the intake side. Therefore, the upper guide portion 50(H) is made up of an inclined surface having an angle θ(ex-H). The scavenging gas is directed in the tangential direction of the inner wall of the cylinder 4 by the upper guide portion 50(H) having the inclination angle θ(ex-H). The inclination angle θ means an inclination angle of the guide surface 50 relative to a straight line parallel to a straight line L connecting the exhaust port 22 and the intake port 20 in a plan view of the combustion chamber 6.

As a result, the scavenging gas guided by the upper guide portion 50(H) is directed in a direction away from the exhaust side of the cylinder and in the tangential direction of the inner wall of the cylinder 4 immediately after the scavenging port 16 is opened by the descending piston 6 until the piston reaches an intermediate portion in the up-down direction of the scavenging port 16 at the initial stage of the scavenging stroke. The scavenging gas having the discharge direction defined by the upper guide portion 50(H) is indicated by a white arrow 42 (FIG. 3). This configuration can prevent an unburned gas, which tends to be generated at the initial stage of scavenging, from blowing-by to the exhaust port 22. Additionally, due to the cross-sectional shape of the upper end portion of the substantially triangular scavenging passage formed by the directivity of the upper guide portion 50(H), the scavenging gas discharged from the variable scavenging port 16(ch) including the guide surface 50 is increased in flow rate as compared to the scavenging gas discharged from the other scavenging ports 16, and therefore, the scavenging gas flow can more variously be controlled not only by the directivity but also by the difference in the flow rate. Furthermore, since the present invention is applied to a portion of the multiple scavenging passages, the scavenging gases discharged from the scavenging ports 16 facing each other can be prevented from colliding with each other due to the directivity and a rate change and causing a portion of the scavenging gases to shortcut to the exhaust port 22.

On the other hand, as can be well understood with reference to FIG. 4, the lower guide portion 50(L) shown in FIG. 4 has substantially the same shape as, for example, the first scavenging port 16(ex1) on the exhaust side, in the cross-sectional shape of the upper end portion of the variable scavenging passage 14(ch) connected to the variable scavenging port 16(ch), i.e., the exhaust-side second scavenging port 16(ex2). The lower guide portion 50(L) is made up of an inclined surface having an angle θ(ex-L) similar to the conventional one although not limited thereto and has a substantially parallelogram shape in a cross-sectional view. As can be seen by comparing FIGS. 3 and 4, the inclination angle θ(ex-L) of the lower guide portion 50(L) has an absolute value larger than an inclination angle θ(ex-H) of the upper guide portion 50(H).

As described above, FIG. 4 is a cross-sectional view taken along the line B-B of FIG. 1. As shown in FIG. 1, on the cutting line B-B, the descending piston 6 is located slightly above the lower end edge of the rectangular scavenging port 16. FIG. 4 shows a form of the upper end portion of the variable scavenging passage 14(ch) immediately before the piston 6 closes the variable scavenging port 16(ch), i.e., the second exhaust side scavenging port 16(ex2) in the variable scavenging passage 14(ch). In other words, FIG. 4 corresponds to a state in which the piston 6 is located below the middle of the rectangular scavenging port 16 in the up-down direction, i.e., the middle stage to the latter half of the scavenging process. In the middle stage and the latter half of the scavenging process, the exhaust port 22 is wide open and the combustion of the gas in the cylinder is sufficiently widened, so that the combustion chamber is filled with the burned gas. The lower guide portion 50(L) in the cylinder in such a state, as shown in FIG. 4, the scavenging gas guided by the lower guide portion 50(L) is directed in the direction opposite to the exhaust port 22 and in the direction displaced from the tangential direction of the inner wall of the cylinder 4 to the central portion of the cylinder 4 until the descending piston 6 reaches an intermediate portion in the up-down direction of the variable scavenging port 16(*ch*) to the lower end edge of the variable scavenging port 16(*ch*).

In the middle stage and the latter half of the scavenging process, the scavenging gas replaces the already burned gas, which has spread throughout the whole area including the central portion of the combustion chamber, over the entire area. Since the cross-sectional area is increased as compared to the upper guide portion 50(H), a relatively gentle flow is formed. As a result, the scavenging gas discharged from the scavenging ports 16 facing each other gently intersects to replace the gas in the entire combustion chamber without the scavenging gas discharged from the scavenging ports 16 shortcutting to the exhaust port 22. Therefore, scavenging can be performed over the entire area of the cylinder without excess or deficiency.

As can be seen from the above description, the directivity direction of the scavenging gas discharged from the variable scavenging port 16(*ch*), i.e., the exhaust-side second scavenging port 16(*ex*2) changes during the scavenging process. In the first process until the variable scavenging port 16(*ch*) is half-opened, the scavenging gas is directed in the tangential direction of the inner wall of the cylinder 4. Subsequently, in the second process from the half-opened state to the closing of the exhaust-side second scavenging port 16(*ex*2), the scavenging gas is directed in the direction away from the tangential direction of the inner wall of the cylinder 4, i.e., the direction approaching the central axis of the cylinder 4.

In this way, by changing the direction of the scavenging gas discharged from the variable scavenging port 16(*ch*), i.e., the exhaust-side second scavenging port 16(*ex*2), from the early stage to the late stage of scavenging in the descending process of the piston 6 in the horizontal plane of the combustion chamber 8 viewed from above, the initial "blow-by" can be prevented, and the scavenging gas can be distributed to the entire area of the combustion chamber 8, so that the scavenging efficiency can be improved. Additionally, by making the flow direction of the scavenging gas different only in a part (the variable scavenging passage 14(*ch*)) of the multiple scavenging passages 14, collision between the scavenging gases discharged from the scavenging ports 16 facing each other is avoided. As a result, the scavenging gas is prevented from losing its directionality after the collision and shortcutting to the exhaust port 22, and the respective scavenging gases discharged from the multiple scavenging ports 16 can flow toward the exhaust port 22 after scavenging in the combustion chamber 8 while maintaining the respective flow paths. Since the two-stroke engine 2 of the embodiment pre-compresses the air-fuel mixture in the crank chamber 12 and uses air-fuel mixture as the scavenging gas, the blow-by of the air-fuel mixture can be prevented to increase the air supply efficiency ηtr. By improving the air supply efficiency ηtr, the combustion efficiency can be improved.

The engine system 100 relates to a layered scavenging engine. The scavenging passage 14 in the layered scavenging engine discharges the leading air to the combustion chamber 8 before the air-fuel mixture at the initial stage of the scavenging stroke. The four scavenging ports 16 including the exhaust-side second scavenging port 16(*ex*2) to which the present invention is applied have a rectangular shape in common with a conventional layered scavenging engine, and the height level of the upper edge of the rectangular scavenging port 16, i.e., the start timing of scavenging, is substantially the same. Therefore, when the leading air from the leading air passage 34 is introduced into the scavenging passages 14 through the piston groove in the intake stroke, all the scavenging passages 14 can be filled with substantially the same sufficient amount of the leading air, so that the scavenging efficiency can be improved without impairing the conventionally known layered scavenging effect.

As can be clearly seen with reference to FIGS. 3 and 4, when comparing the cross-sectional shape of the upper end portion of the variable scavenging passage 14(*ch*) formed by the upper guide portion 50(H) and the cross-sectional shape formed by the lower guide portion 50(L), the effective cross-sectional area of the passage is different. Due to this difference, diversity is added to the flow rate of the scavenging gas discharged from the variable scavenging port 16(*ch*), and the scavenging gases discharged facing each other can evenly be distributed in the combustion chamber 8 without colliding with each other in terms of directivity and time. Although the scavenging passage cross-sectional area formed by the upper guide portion 50(H) in the embodiment is set to 37% of the scavenging passage cross-sectional area formed by the lower guide portion 50(L), the numerical value "37%" can be optimized by adjustment within the range of 20% to 70% in accordance with the balance between the engine displacement and the required leading air amount.

Figure 7:
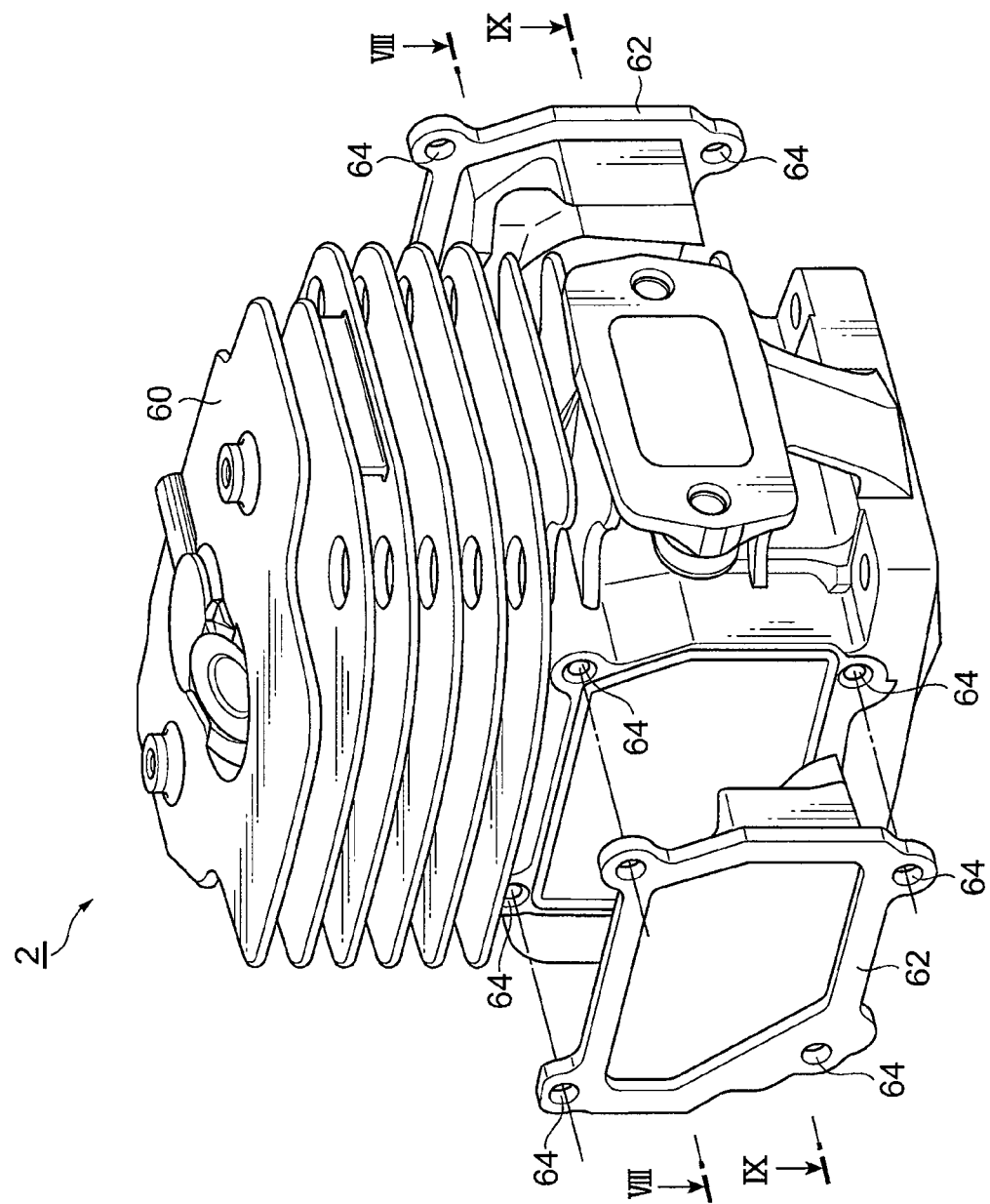
FIG. 7 shows a perspective view of a cylinder block of the engine of the embodiment.
Figure 8:
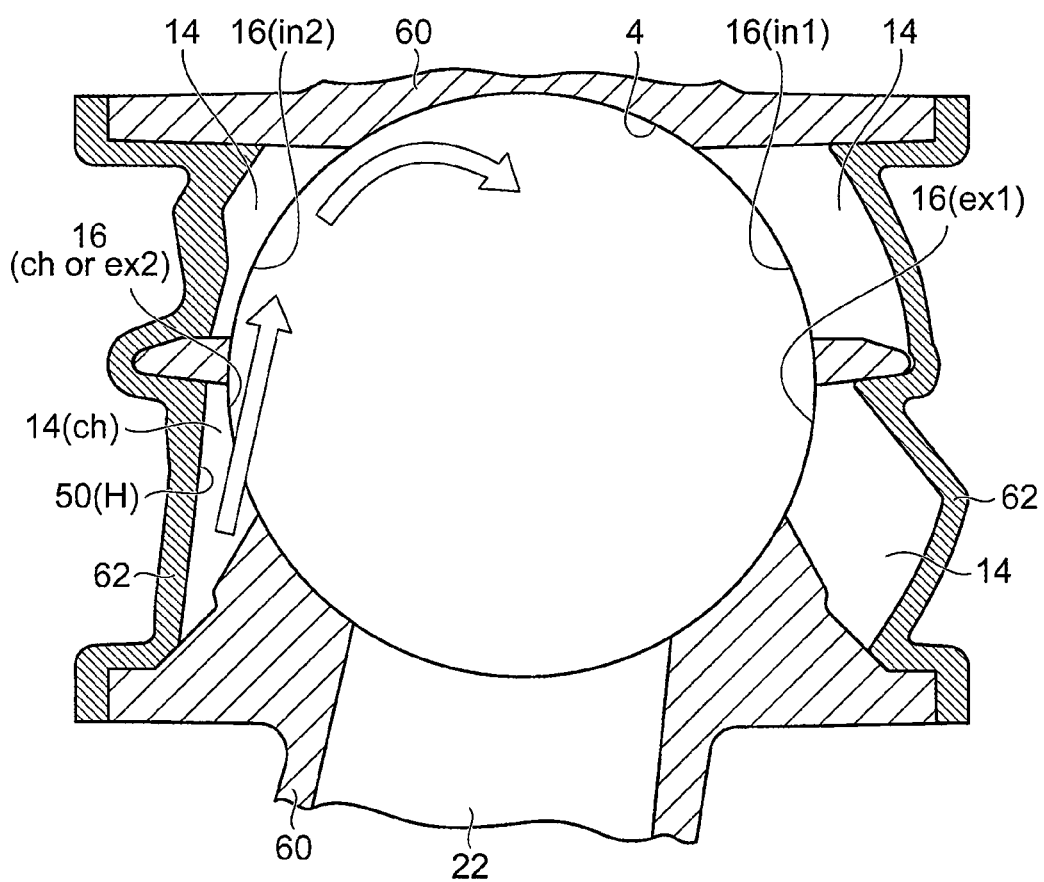
FIG. 8 shows a cross-sectional view taken along a line VIII-VIII of FIG. 7.
Figure 9:
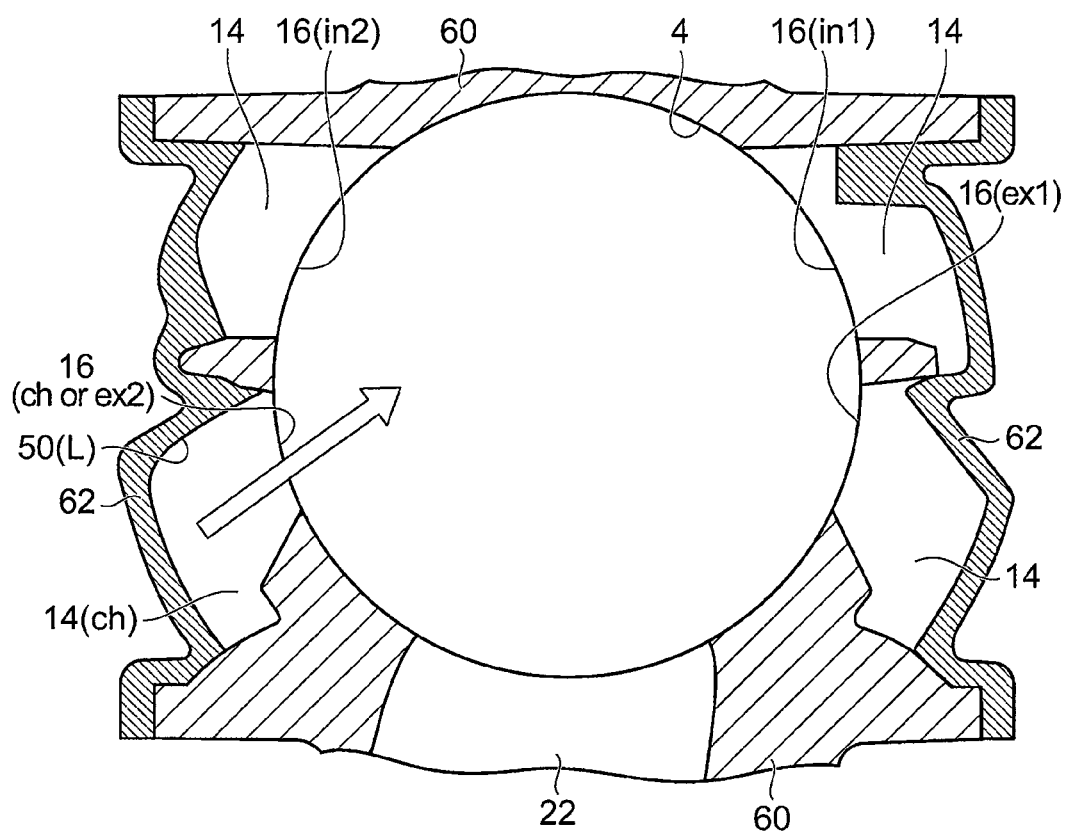
FIG. 9 shows a cross-sectional view taken along a line IX-IX of FIG. 7.

FIGS. 7 to 9 show specific examples of the engine 2 described with reference to FIGS. 1 and 3 to 5. FIG. 7 shows a cylinder block 60 constituting the engine 2. In the cylinder block 60, a portion corresponding to the four scavenging ports 16 and the upper portions of the scavenging passages 14 connected thereto are made up of a pair of scavenging passage forming caps 62 screwed to the cylinder block 60. Reference numeral 64 of FIG. 7 denotes a screw hole.

FIG. 8 is a cross-sectional view taken along a line VIII-VIII of FIG. 7 and is a cross-sectional view corresponding to FIG. 3 described above. FIG. 9 is a cross-sectional view taken along a line IX-IX of FIG. 7 and is a cross-sectional view corresponding to FIG. 4 described above. As shown in these drawings, the guide surface 50 is formed by the scavenging passage forming cap 62. In the embodiment, the upper ends of all four scavenging passages are formed by the scavenging passage forming cap 62; however, only the variable scavenging passage 14(*ch*) may be formed by the scavenging passage forming cap 62.

As described above, the side wall surface on the cylinder intake side of the upper end portion of the variable scavenging passage 14(*ch*) connected to the rectangular variable scavenging port 16(*ch*) constitutes the guide surface 50, and the scavenging gas is directed to the intake side by the guide surface 50. Therefore, the directivity direction of the scavenging gas changes on the horizontal plane in the scavenging stroke. FIGS. 10 to 13 are views for explaining modifications of the guide surface 50 shown in FIG. 5. The guide surface 50 shown in FIG. 5 described above is made up of a two-stage guide portion of the upper guide portion 50(H) and the lower guide portion 50(L); however, a three-stage guide portion may be formed from the upper side to the lower side.

Figure 10:
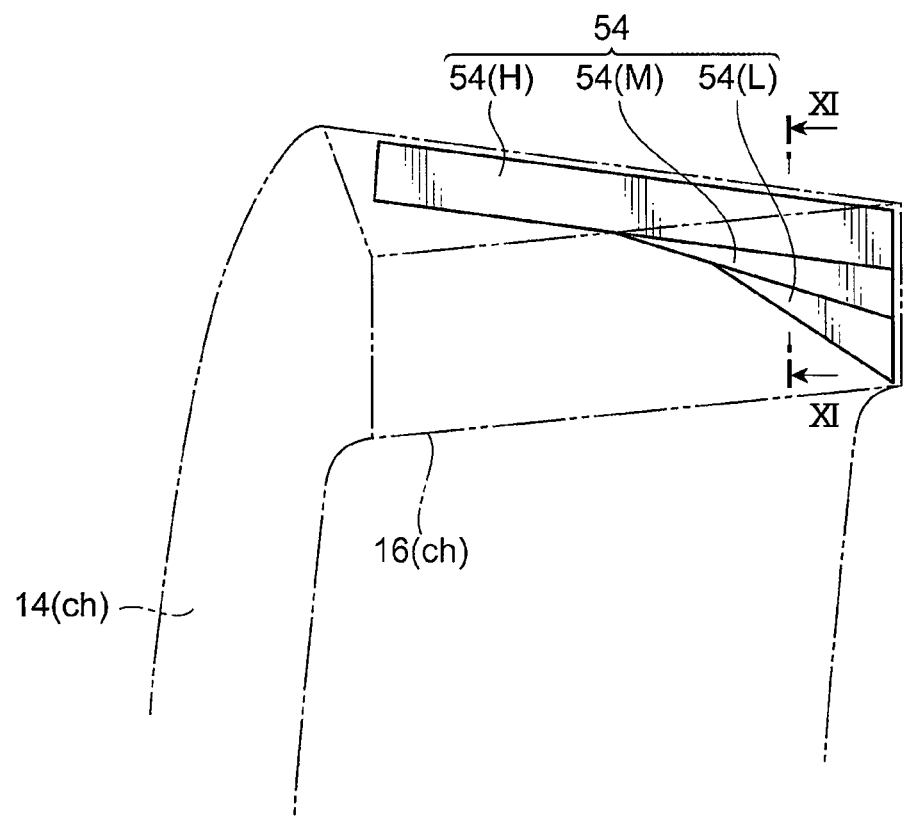
FIG. 10 shows a schematic view for explaining a three-stage guide surface that is a modification of a guide surface shown in FIG. 5.
Figure 11:
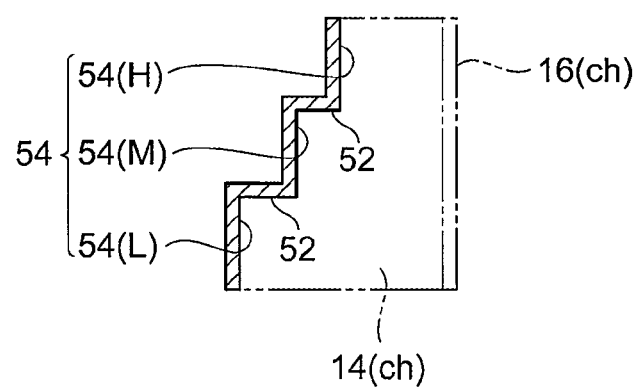
FIG. 11 shows a cross-sectional view taken along a line XI-XI of FIG. 10.

FIG. 11 is a cross-sectional view taken along a line XI-XI of FIG. 10. Specifically, with reference to FIGS. 10 and 11, a guide surface 54 of a first modification has a middle guide portion 54(M) between an upper guide portion 54(H) and a lower guide portion 54(L). The upper guide portion 54(H) and the lower guide portion 54(L) included in the first modification are made up of the surfaces having, for example, the same inclination angle θ as the upper guide portion 50(H) and the lower guide portion 50(L), respectively, included in the guide surface 50 of FIG. 5 described above. The middle guide portion 54(M) preferably has the inclination angle θ intermediate between the upper guide portion 54(H) and the lower guide portion 54(L); however, the present invention is not limited thereto, and the angle may be different. As a result, in the scavenging stroke, the directivity direction of the scavenging gas can be changed in three stages on the horizontal plane.

As described above, the middle guide portion 54(M) preferably has the inclination angle θ between the upper guide portion 54(H) and the lower guide portion 54(L); however, the present invention is not limited thereto. For example, the inclination angle θ of the middle guide portion 54(M) may be set to the same value as the inclination angle θ of the lower guide portion 50(L) included in the guide surface 50 of FIG. 5, and the inclination angle θ of the lower guide portion 54(L) may be set to a value different from the inclination angle θ of the middle guide portion 54(M). Alternatively, the respective inclination angles of the upper guide portion 54(H), the middle guide portion 54(M), and the lower guide portion 54(L) may be set to sequentially different values in stages.

In another example, the inclination angle θ of the middle guide portion 54(M) may be set to the same value as the inclination angle θ of the upper guide portion 50(H) included in the guide surface 50 of FIG. 5, and the inclination angles θ of the upper guide portion 54(H) and the lower guide portion 54(L) may be set to, for example, the same value as the inclination angle θ of the lower guide portion 50(L) included in the guide surface 50 of FIG. 5. Obviously, the inclination angles θ of the upper guide portion 54(H) and the lower guide portion 54(L) may be different.

Figure 12:
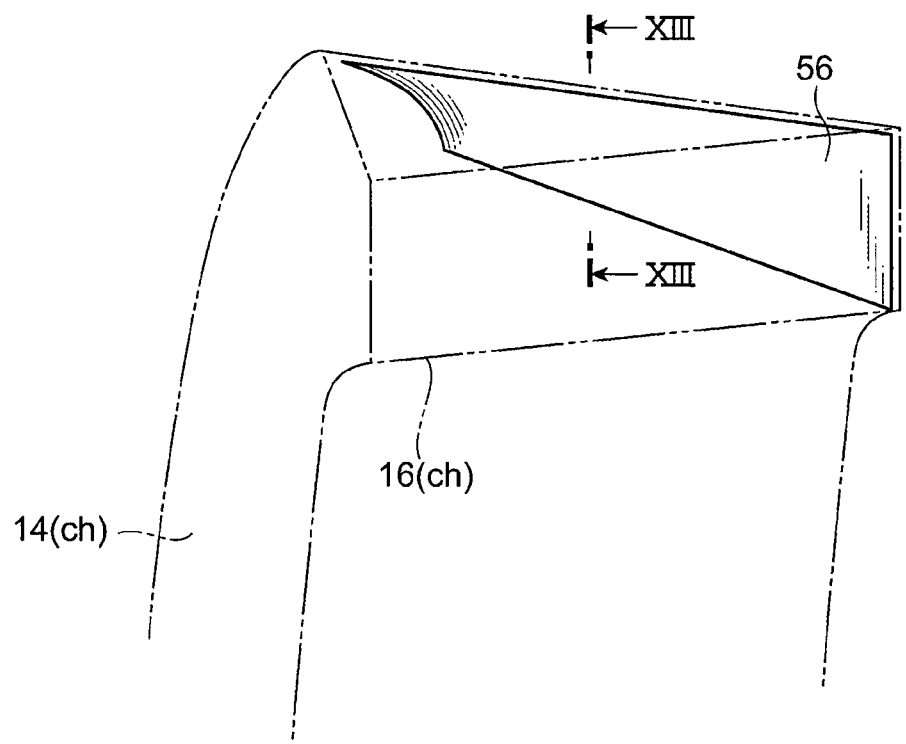
FIG. 12 shows a schematic view for explaining a non-stage guide surface that is a modification of the guide surface shown in FIG. 5.
Figure 13:
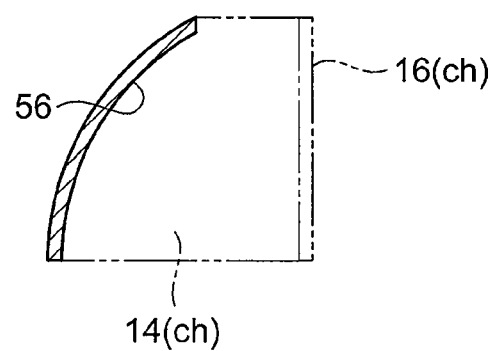
FIG. 13 shows a cross-sectional view taken along a line XIII-XIII of FIG. 12.

In a further modification of the guide surface 50, the guide surface may be made up of a multi-stage guide portion such as four-stage and five-stage. As a result, in the scavenging stroke, the directivity direction of the scavenging gas can be changed in multiple stages on the horizontal plane. In another modification 56 of the guide surface 50, as shown in FIGS. 12 and 13, a curved non-stage guide surface may be formed. FIG. 13 is a cross-sectional view taken along a line XIII-XIII of FIG. 12. As a result, in the scavenging stroke, the directivity direction of the scavenging gas can be changed without stages on the horizontal plane.

Although the present invention is applied to a layered scavenging engine in the embodiments described above, the present invention can be applied to a two-stroke engine in which the scavenging gas does contains no leading air, i.e., an engine of a type in which the air-fuel mixture pre-compressed in the crank chamber 12 is used as the scavenging gas.

The present invention can also suitably be applied to a two-stroke engine using a fuel injection device instead of the carburetor 28. For example, when the present invention is applied to an in-cylinder direct injection two-stroke engine, the air pre-compressed in the crank chamber is used as the scavenging gas. By applying the present invention to this in-cylinder direct injection two-stroke engine, the scavenging efficiency in the cylinder can be improved.

Figure 14:
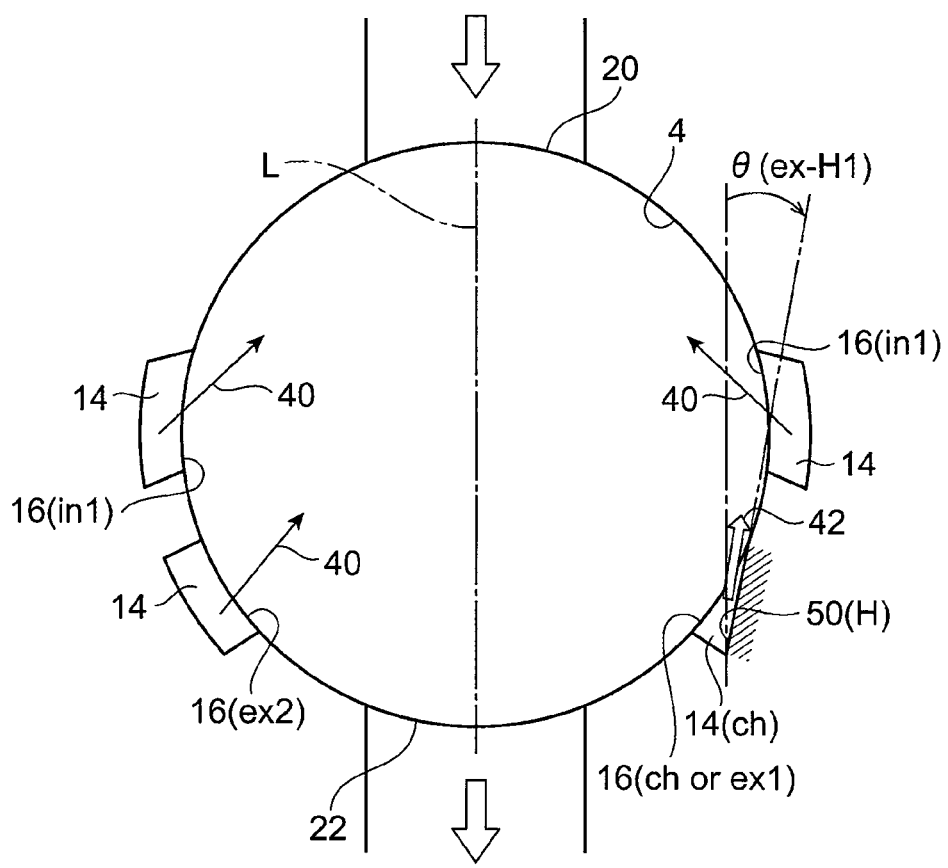
FIG. 14 shows a diagram corresponding to FIG. 3 and for explaining an example in which the present invention is applied to an upper end portion of a scavenging passage connected to an exhaust side first scavenging port facing an exhaust-side second scavenging port of a cylinder of four-flow scavenging.

Description will hereinafter be made of modifications related to the variable scavenging port 16(*ch*) and the upper end portion of the variable scavenging passage 14(*ch*) connected thereto to which the present invention is applied with reference to FIGS. 14 to 18. Obviously, these modifications can also be applied to a layered scavenging engine and an engine of a type in which the air-fuel mixture pre-compressed in the crank chamber 12 is used as the scavenging gas. In the embodiment described above with reference to FIG. 3, the present invention is applied to the upper end portion of the scavenging passage 14 connected to the exhaust-side second scavenging port 16(*ex*2); however, instead, as shown in FIG. 14, the present invention may be applied to the upper end portion of the scavenging passage 14(*ch*) connected to the exhaust-side first scavenging port 16(*ex*1) facing the exhaust side second scavenging port 16(*ex*2). In a further modification, instead of the exhaust-side first or second scavenging port 16(*ex*1 or *ex*2), the present invention may be applied to the upper end portion of the scavenging passage 14 connected to the intake-side first or second scavenging port 16 (*in*1 or *in*2).

Figure 15:
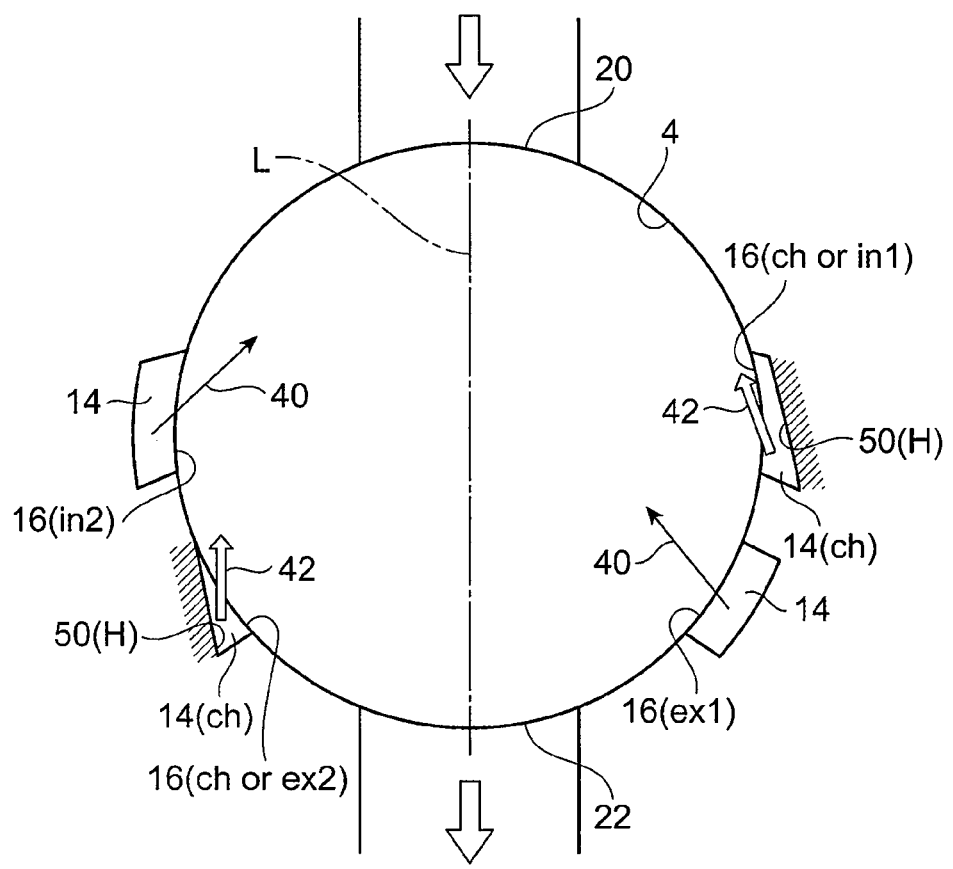
FIG. 15 shows a diagram for explaining an example in which the present invention is applied to an upper end portion of the scavenging passage connected to the exhaust-side second scavenging port and an upper end portion of a scavenging passage connected to an intake-side first scavenging port.

FIG. 15 shows an example in which the present invention is applied to the upper end portion of the scavenging passage 14(*ch*) connected to the exhaust-side second scavenging port 16(*ex*2) and the upper end portion of the scavenging passage 14(*ch*) connected to the intake-side first scavenging port 16(*in*1). In a modification, the present invention may be applied to the upper end portion of the scavenging passage 14 connected to the exhaust-side first scavenging port 16(*ex*1) and the upper end portion of the scavenging passage 14 connected to the intake-side second scavenging port 16(*in*2).

Figure 16:
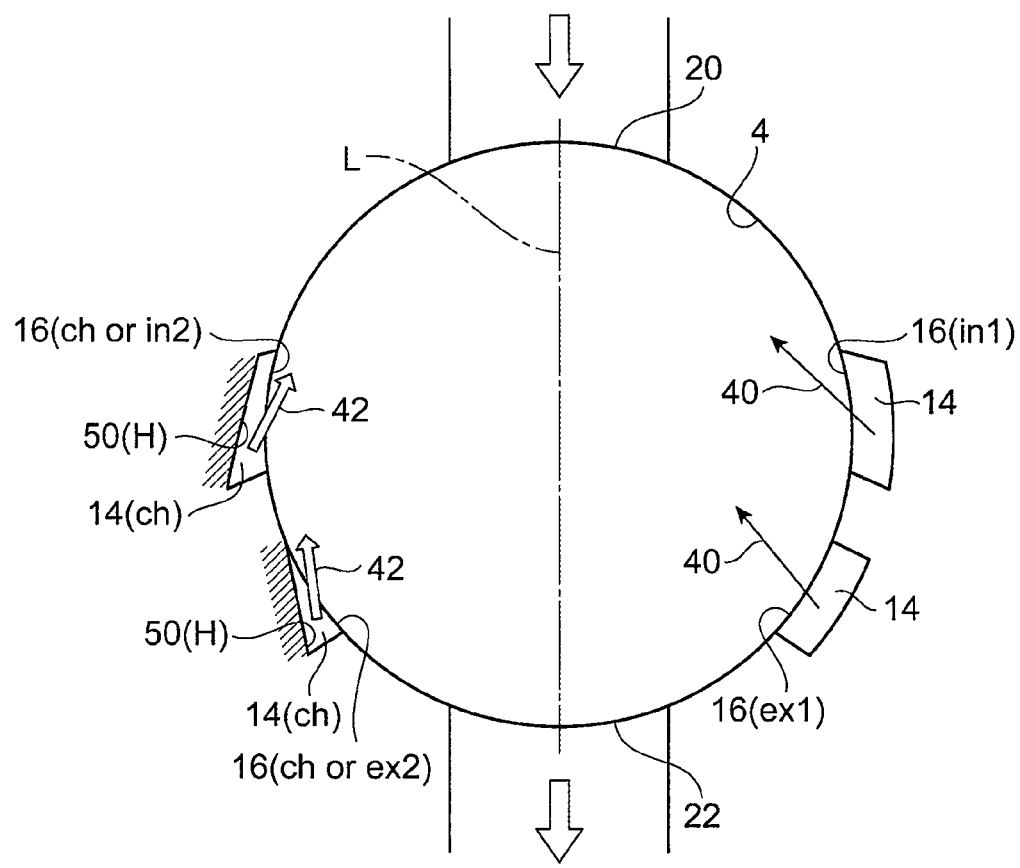
FIG. 16 shows a diagram for explaining an example in which the present invention is applied to an upper end portion of the scavenging passage connected to the exhaust-side second scavenging port located on one side of the cylinder and an upper end portion of the scavenging passage connected to the intake-side second scavenging port.

FIG. 16 shows an example in which the present invention is applied to the upper end portion of the scavenging passage 14(*ch*) connected to the exhaust-side second scavenging port 16(*ex*2) located on one side of the cylinder and the upper end portion of the scavenging passage 14(*ch*) connected to the intake-side second scavenging port 16(*in*2). In a modification, the present invention may be applied to the upper end portion of the scavenging passage 14 connected to the exhaust-side first scavenging port 16(*ex*1) and the upper end portion of the scavenging passage 14 connected to the intake-side first scavenging port 16(*in*1).

Figure 17:
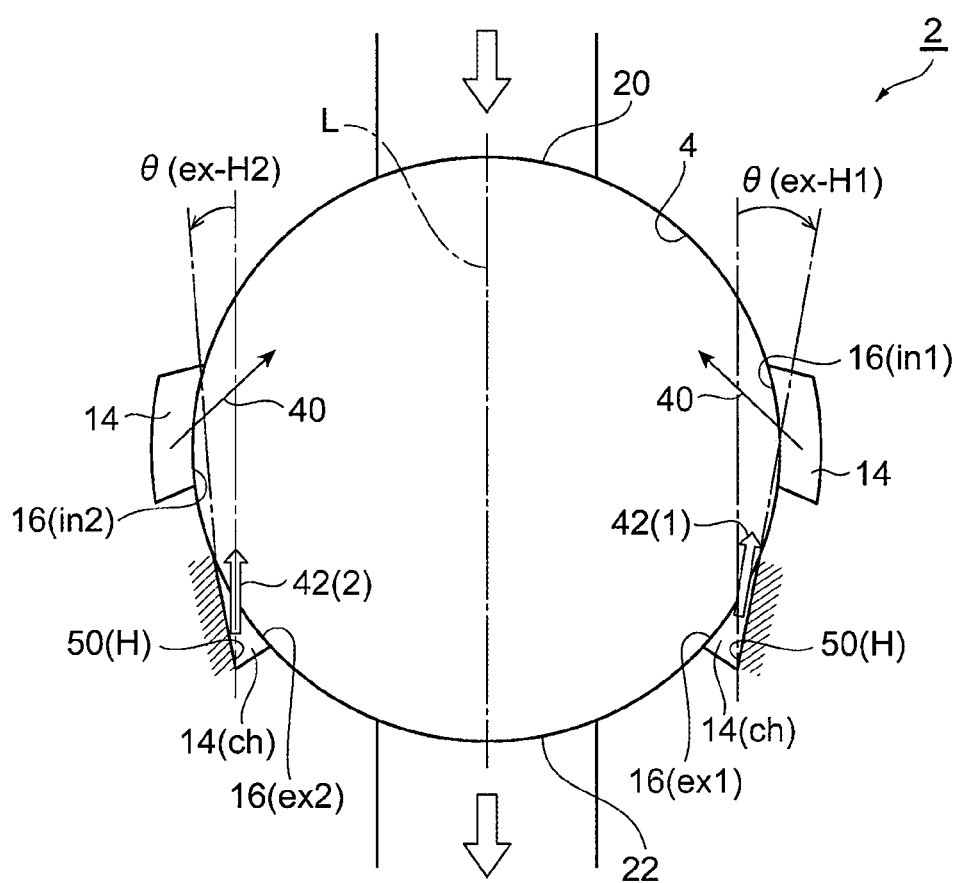
FIG. 17 shows a diagram for explaining an example in which the present invention is applied to an upper end portion of a scavenging passage connected to each of the first and second scavenging ports facing each other on the exhaust side of the cylinder.

FIG. 17 shows an example in which the present invention is applied to the upper end portion of the scavenging passage 14(*ch*) connected to each of the first and second scavenging ports 16(*ex*1), 16(*ex*2) facing each other on the exhaust side of the cylinder. In a modification, the present invention may be applied to the upper end portion of the scavenging passage 14 connected to each of the first and second scavenging ports 16(*in*1), 16(*in*2) facing each other on the intake side of the cylinder.

Figure 18:
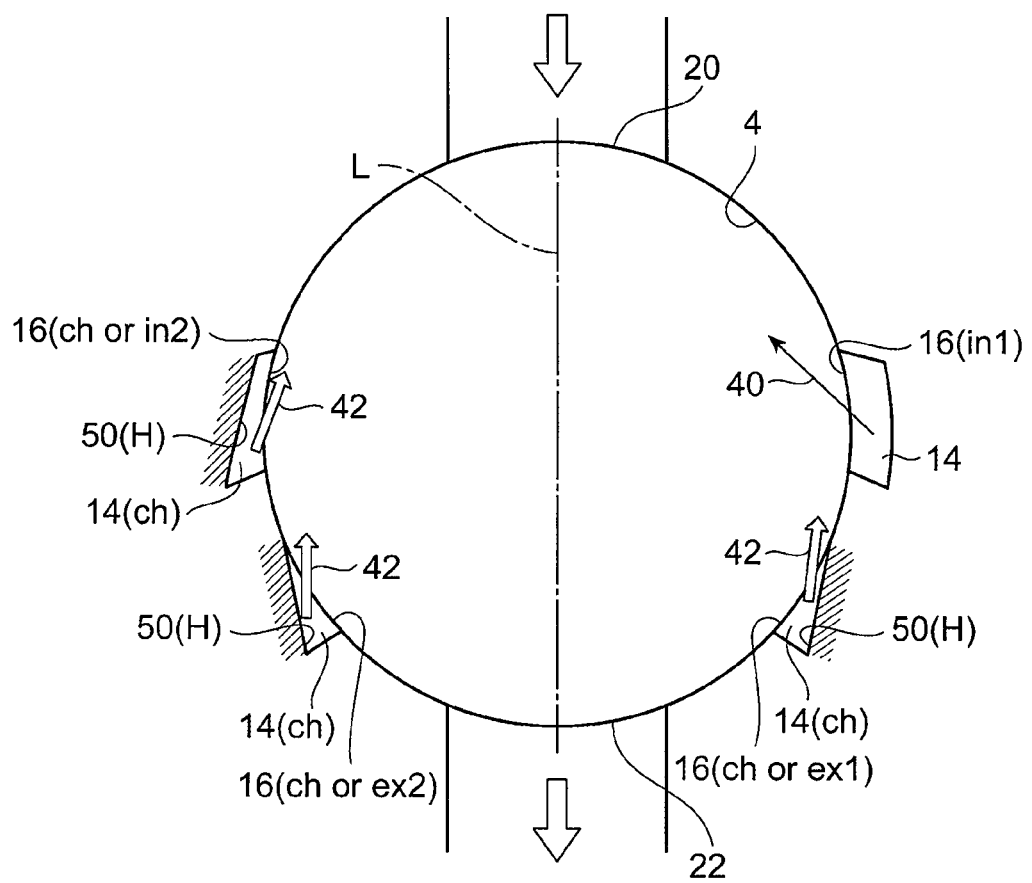
FIG. 18 shows a diagram for explaining an example in which the present invention is applied to upper end portions of scavenging passages connected to three scavenging ports excluding a scavenging passage connected to the intake-side first scavenging port.

The present invention may be applied to the upper end portion of each of the respective scavenging passages 14 connected to the three scavenging ports 16 except one among the four scavenging ports 16 included in the cylinder. FIG. 18 illustratively shows an example in which the present invention is applied to the upper end portions of the scavenging passages 14(*ch*) connected to the three scavenging ports 16(*ch*) except the scavenging passage 14 connected to the intake-side first scavenging port 16(*in*1). The one scavenging port 16 to which the present invention is not applied may be the intake-side second scavenging port 16(*in*2) or the exhaust-side first or second scavenging port 16(*ex*1 or *ex*2).

Figure 19:
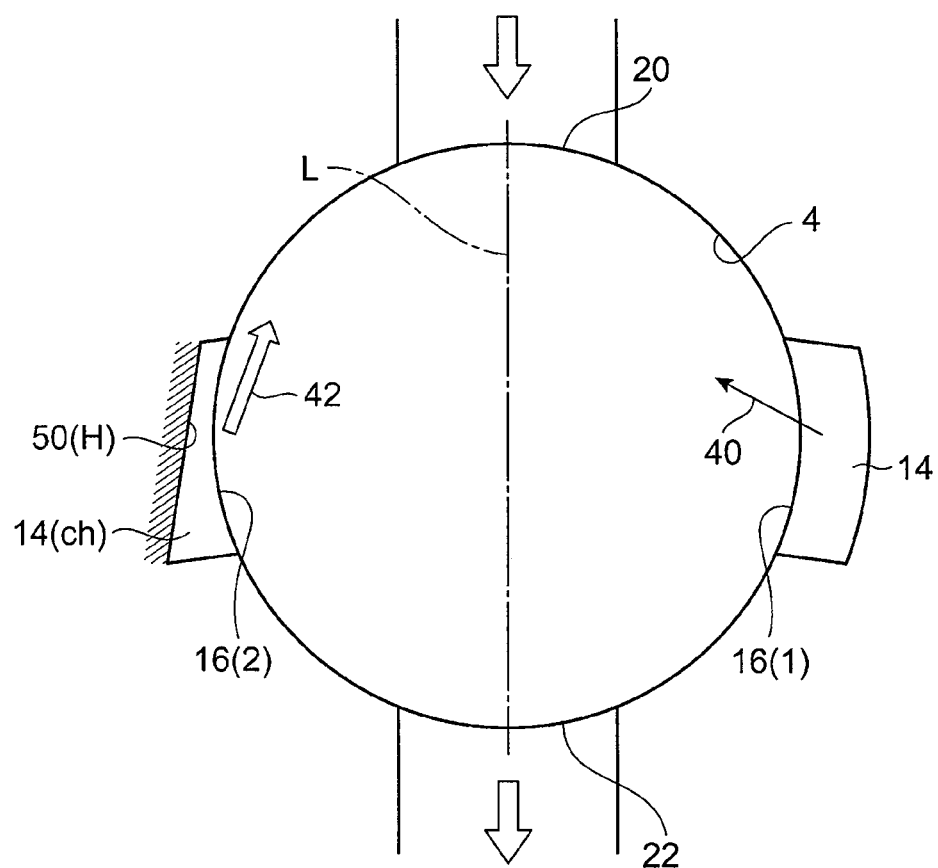
FIG. 19 shows a diagram for explaining an example in which the present invention is applied to an upper end portion of a scavenging passage connected to a scavenging port located on one side of a cylinder of two-flow scavenging.
Figure 20:
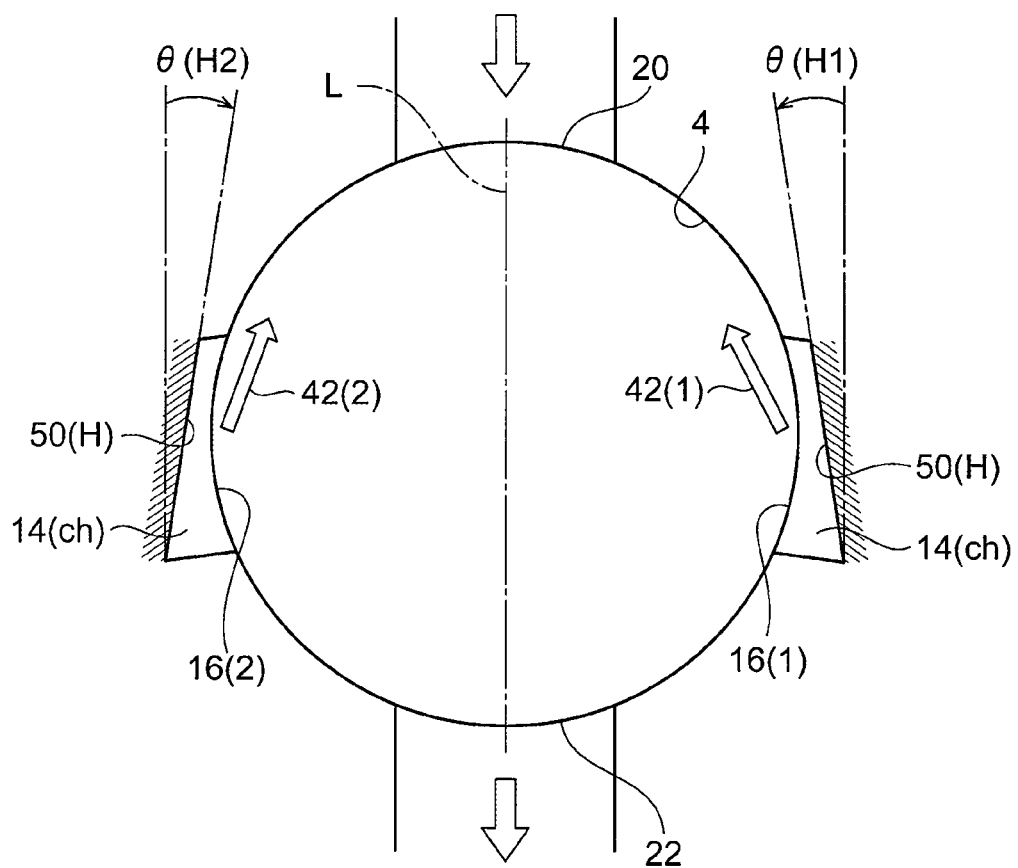
FIG. 20 shows a diagram for explaining an example in which the present invention is applied to an upper end portion of a scavenging passage connected to each of scavenging ports located on both sides of a cylinder of two-flow scavenging.

The present invention is suitably applicable to a two-flow scavenging engine having one scavenging port 16 on each side of the cylinder. FIG. 19 shows an example in which the present invention is applied to the upper end portion of the scavenging passage 14 connected to the scavenging port 16(2) located on one side of the cylinder. FIG. 20 shows an example in which the present invention is applied to the upper end portion of the scavenging passage 14 connected to each of the scavenging ports 16(1), 16(2) located on both sides of the cylinder.

In the examples shown in FIGS. 17, 18, and 20, the exhaust-side scavenging ports 16(*ex*1), 16(*ex*2), 16(1), 16(2) facing each other are the variable scavenging ports 16(*ch*)

related to the variable scavenging passages 14(*ch*) to which the present invention is applied, and in the representative example of FIG. 17, an inclination angle θ(ex-H1) of the upper guide surface 50(H) related to the exhaust-side first scavenging port 16(*ex*1) is preferably set to a different value from an inclination angle θ(ex-H2) of the upper guide surface 50(H) related to the exhaust-side second scavenging port 16(*ex*2) so that a scavenging airflow 42(1) discharged from the exhaust-side first scavenging port 16(*ex*1) does not collide with a scavenging airflow 42(2) discharged from the exhaust-side second scavenging port 16(*ex*2). This configuration prevents the scavenging gases discharged from the scavenging ports 16 facing each other from colliding with each other and shortcutting to the exhaust port 22, so that the scavenging gases discharged from the scavenging ports 16 goes to the exhaust port 22 after scavenging the combustion chamber while maintaining the respective flow paths.

Although the present invention has been described in relation to the upper guide portion 50(H) with reference to FIGS. 15, 16, etc., the same description applies to the lower guide portion 50(L).

Although each of the guide surfaces 50(H), 50(L), 54(H), 54(M), 54(L) described above is made up of a linearly extending surface as can be seen from the drawings, the surfaces may be made up of a curved surface in a plan view. At least one of the guide surfaces 50(H), 50(L), 54(H), 54(M), 54(L) may have a surface shape that is a bent surface shape including multiple divided surfaces. Describing the bent surface shape with reference numeral 58 added to the divided surfaces, FIG. 21 and reference numeral 22 show examples in which the surface shape is formed by two divided surfaces 58(1), 58(2); however, these are merely exemplifications, and the surface shape may be formed by three or more divided surfaces.

Figure 21:
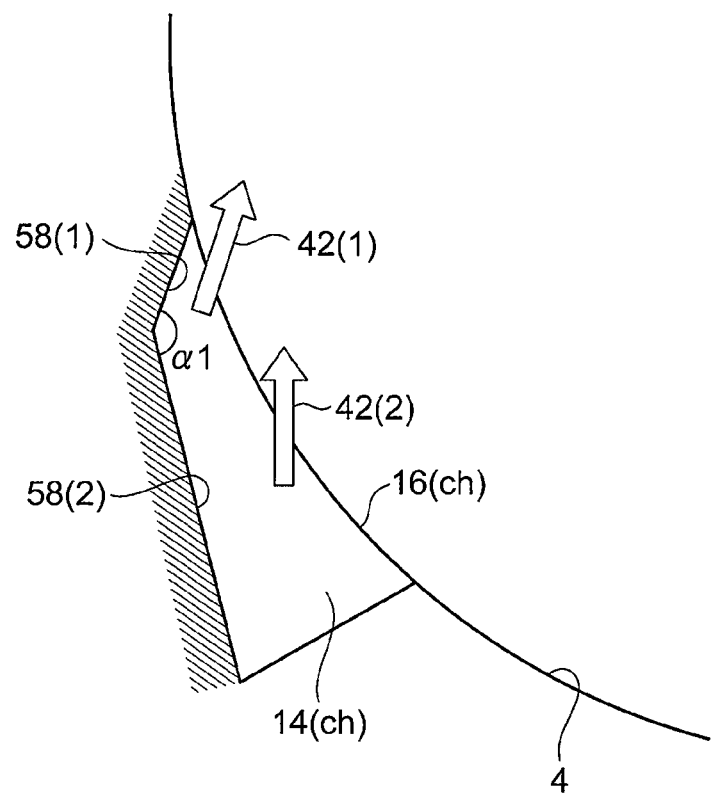
FIG. 21 shows a diagram for explaining an example in which a guide surface is made up of first and second divided surfaces, and an angle formed by the first and second divided surfaces toward the cylinder is an acute angle.
Figure 22:
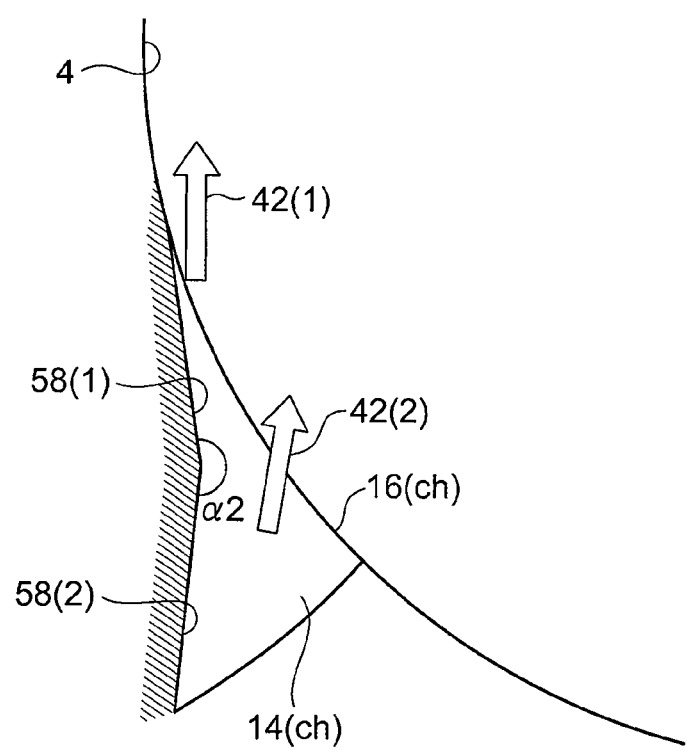
FIG. 22 shows a diagram for explaining an example in which the guide surface is made up of the first and second divided surfaces, and an angle formed by the first and second divided surfaces toward the cylinder is an obtuse angle.

FIG. 21 shows an example in which an angle α1 between the first and second divided surfaces 58(1) and 58(2), i.e., an angle formed toward the inside of the cylinder 4 by the first and second divided surfaces 58(1) and 58(2), is an acute angle, and FIG. 22 shows an example in which an angle α2 between the first and second divided surfaces 58(1) and 58(2), i.e., an angle formed toward the inside of the cylinder 4 by the first and second divided surfaces 58(1) and 58(2), is an obtuse angle. The guide surfaces 50(H), 50(L), 54(H), 54(M), 54(L) made up of the first and second divided surfaces 58 (1) and 58 (2) illustrated in FIGS. 21 and 22 can discharge the scavenging gas in two directions as indicated by white arrows 42(1), 42(2) of FIGS. 21 and 22.

100 single-cylinder two-stroke internal combustion engine system
2 engine of embodiment
4 cylinder
6 piston
8 combustion chamber
12 crank chamber
14 scavenging passage
14(*ch*) variable scavenging passage
16 scavenging port
16(*ch*) variable scavenging port
22 exhaust port
50 guide surface
50(H) upper guide portion
50(L) lower guide portion
52 step portion
54 guide surface of first modification
54(H) upper guide section
54(M) middle guide portion
54(L) lower guide portion
60 cylinder block
62 scavenging passage forming cap
64 screw hole

What is claimed is:

1. A two-stroke internal combustion engine comprising:
   a piston disposed in a cylinder, reciprocating between a top dead center and a bottom dead center, and defining a combustion chamber;
   an exhaust port opening in the cylinder and opened and closed by the piston for discharging a burnt gas in the combustion chamber;
   a crank chamber receiving a fresh gas and pre-compressing the fresh gas by a descending movement of the piston; and
   a plurality of scavenging passages including scavenging ports for communicating with the combustion chamber and the crank chamber in the scavenging stroke and discharging the fresh gas pre-compressed in the crank chamber as a scavenging gas to the combustion chamber, the scavenging port opened and closed by the piston, wherein
   the scavenging passage included in the plurality of scavenging passages and connected to at least one of the scavenging ports constitutes a variable scavenging passage, wherein
   an upper end portion of the variable scavenging passage has a guide surface being constituted by a side wall surface of the variable scavenging passage on a cylinder intake side and defining a discharge direction of the scavenging gas discharged from a variable scavenging port connected thereto on a horizontal plane, wherein
   the guide surface includes at least a first guide portion defining a first discharge direction of the scavenging gas and a second guide portion defining a second discharge direction of the scavenging gas, and wherein
   the discharge direction of the scavenging gas is changed horizontally, orthogonal to a vertical movement of the piston, from the first discharge direction to the second discharge direction by the first and second guide portions in the scavenging stroke.

2. The two-stroke internal combustion engine according to claim 1, wherein
   the guide surface has an upper guide portion and a lower guide portion, wherein
   the guide surface has a step portion between the upper guide portion and the lower guide portion, wherein
   the first discharge direction is defined by the upper guide portion, wherein
   the second discharge direction is defined by the lower guide portion, and wherein
   the step portion forming a boundary between the upper guide portion and the lower guide portion is located at an intermediate portion in a vertical direction of the variable scavenging port.

3. The two-stroke internal combustion engine according to claim 1, wherein the guide surface has a middle guide portion defining a third discharge direction of the scavenging gas between the upper guide portion and the lower guide portion.

4. The two-stroke internal combustion engine according to claim 1, wherein the guide surface is made up of a multi-stage guide portion in a vertical direction.

5. The two-stroke internal combustion engine according to claim 1, wherein the scavenging passage connected to one scavenging port of the plurality of scavenging ports is a variable scavenging passage.

6. The two-stroke internal combustion engine according to claim 1, wherein
the engine has four scavenging ports, and wherein
the scavenging passage connected to at least one of the four scavenging ports is the variable scavenging passage.

7. The two-stroke internal combustion engine according to claim 6, wherein a directivity direction of the scavenging gas discharged from the variable scavenging ports facing each other is set so that the scavenging gases discharged from the variable scavenging ports of the plurality of variable scavenging ports and facing each other do not collide with each other.

8. The two-stroke internal combustion engine according to claim 1, wherein the scavenging passages connected to the scavenging ports excluding at least one scavenging port of the plurality of scavenging ports are the variable scavenging passages.

9. The two-stroke internal combustion engine according to claim 8, wherein a directivity direction of the scavenging gas discharged from the variable scavenging ports facing each other is set so that the scavenging gases discharged from the variable scavenging ports of the plurality of variable scavenging ports and facing each other do not collide with each other.

10. The two-stroke internal combustion engine according to claim 1, wherein all the scavenging ports included in the engine are opened at the same timing.

11. The two-stroke internal combustion engine according to claim 1, wherein at least the guide surface of the variable scavenging passage of the plurality of scavenging passages included in the engine is formed by a scavenging passage forming cap attached to a cylinder block.

12. The two-stroke internal combustion engine according to claim 1, wherein the two-stroke engine is a reverse scavenging engine.

13. The two-stroke internal combustion engine according to claim 1, wherein the two-stroke engine is a layered scavenging engine.

* * * * *